US011931697B2

United States Patent
Liu et al.

(10) Patent No.: US 11,931,697 B2
(45) Date of Patent: Mar. 19, 2024

(54) SEPARATION OF GASES VIA CARBONIZED VINYLIDENE CHLORIDE COPOLYMER GAS SEPARATION MEMBRANES AND PROCESSES THEREFOR

(71) Applicant: Dow Global Technologies LLC, Midland, MI (US)

(72) Inventors: Junqiang Liu, Manvel, TX (US); Douglas E. Beyer, Midland, MI (US); Janet M. Goss, Saginaw, MI (US); Chan Han, Midland, MI (US); Edward M. Calverley, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 139 days.

(21) Appl. No.: 17/231,358

(22) Filed: Apr. 15, 2021

(65) Prior Publication Data

US 2021/0229045 A1    Jul. 29, 2021

Related U.S. Application Data

(62) Division of application No. 16/085,038, filed as application No. PCT/US2017/022275 on Mar. 14, 2017, now Pat. No. 11,007,488.

(60) Provisional application No. 62/308,899, filed on Mar. 16, 2016.

(51) Int. Cl.
*B01D 69/02* (2006.01)
*B01D 53/22* (2006.01)
*B01D 67/00* (2006.01)
*B01D 71/02* (2006.01)
*B01D 71/30* (2006.01)
*B01D 71/80* (2006.01)
*B01D 69/08* (2006.01)
*B01D 71/40* (2006.01)
*B01D 71/42* (2006.01)

(52) U.S. Cl.
CPC ........... *B01D 69/02* (2013.01); *B01D 53/228* (2013.01); *B01D 67/0067* (2013.01); *B01D 71/021* (2013.01); *B01D 71/028* (2013.01); *B01D 71/30* (2013.01); *B01D 71/80* (2013.01); *B01D 67/002* (2013.01); *B01D 69/08* (2013.01); *B01D 71/40* (2013.01); *B01D 71/42* (2013.01); *B01D 2256/10* (2013.01); *B01D 2256/20* (2013.01); *B01D 2256/22* (2013.01); *B01D 2256/245* (2013.01); *B01D 2257/108* (2013.01); *B01D 2325/022* (2013.01); *B01D 2325/04* (2013.01); *B01D 2325/20* (2013.01)

(58) Field of Classification Search
CPC ........ B01D 69/02; B01D 67/00; B01D 53/22; B01D 71/30; B01D 71/02
See application file for complete search history.

(56) References Cited

U.S. PATENT DOCUMENTS

| 5,902,562 A | 5/1999 | Lagasse et al. |
|---|---|---|
| 5,993,969 A | 11/1999 | Tan |
| 7,404,844 B2 | 7/2008 | Tin et al. |
| 8,337,725 B2 * | 12/2012 | Abusleme ............... B01D 69/02 252/511 |

FOREIGN PATENT DOCUMENTS

| EP | 0459623 | 12/1991 |
|---|---|---|
| IL | 83310 | 7/1992 |
| JP | 2005310836 | 11/2005 |
| WO | 2016/003680 | 1/2016 |

OTHER PUBLICATIONS

Centeno et al. (Carbon molecular sieve gas separation membranes based on poly(vinylidene chloride-co-vinyl chloride), 2000, vol. 38, pp. 1067-1073) (Year: 2000).*

Rao, M.B., et. al., "Nanoporous carbon membranes for separation of gas mixtures by selective surface flow," Journal Membrane Science, 1993, p. 253-265, v.85, Elsevier Science Publishers, B.V., Amsterdam.

Centeno, Teresa A., et al., "Carbon molecular sieve gas separation membranes based on poly(vinylidene chloride-co-vinly chloride)," Carbon, 2000, p. 1067-1073, v. 38, Pergamon.

Itta, Arun Kumar, et. al., "Hydrogen separation performance of CMS membranes derived from the imide-functional group of two similar types of precursors," International Journal of Hydrogen Energy, 2011, p. 8645-8657, v. 36, Elsevier.

Zhang, Ke, et al., "Optimizing the synthesis of composite polyvinylidene dichloride-based selective surface flow carbon membranes for gas separation," Journal of Membrane Science, 2011, p. 243-249, v. 369, Elsevier.

Staudt-Bickel, C., et al., "Olefin/paraffin gas separations with 6FDA-based polyimide membranes," Journal of Membrane Science, 2000, p. 205-214, v. 170, No. 2.

(Continued)

*Primary Examiner* — Youngsul Jeong
(74) *Attorney, Agent, or Firm* — Dinsmore & Shohl LLP

(57) ABSTRACT

A process for separating hydrogen from a gas mixture having hydrogen and a larger gas molecule is comprised of flowing the gas mixture through a carbonized polyvinylidene chloride (PVDC) copolymer membrane having a hydrogen permeance in combination with a hydrogen/methane selectivity, wherein the combination of hydrogen permeance and hydrogen/methane selectivity is (i) at least 30 GPU hydrogen permeance and at least 200 hydrogen/methane selectivity or (ii) at least 10 GPU hydrogen permeance and at least 700 hydrogen/methane selectivity. The carbonized PVDC copolymer may be made by heating and restraining a polyvinylidene chloride copolymer film or hollow fiber having a thickness of 1 micrometer to 250 micrometers to a pretreatment temperature of 100° C. to 180° C. to form a pretreated polyvinylidene chloride copolymer film and then heating and restraining the pretreated polyvinylidene chloride copolymer film to a maximum pyrolysis temperature from 350° C. to 750° C.

8 Claims, No Drawings

(56) References Cited

OTHER PUBLICATIONS

Dabrowski, A., "Adsorption—from theory to practice," Advances in Colloid and Interface Science, 2001, p. 1354-224, v. 93, No. 1-3.
Mohamed, Abdul Rahman, et al., "Preparation of carbon molecular sieve from lignocellulosic biomass: A review," Renewable and Sustainable Energy Reviews, 2010, p. 1591-1599, v. 14.
Saufi, S.M., et al., "Fabrication of carbon membranes for gas separation—a review," Carbon, 2004, p. 241-259, v. 42, Elsevier.
Rungta, Meha, et al., "Carbon molecular sieve dense film membranes derived from Martrimid for ethylene/ethane separation," Carbon, 2012, p. 1488-1502, v. 50, No. 4, Elsevier.
Ning, Xue, et al., "Carbon molecular sieve membranes derived from Martrimid polyimide for nitrogen/methane separation," Carbon, 2014, p. 511-522, v. 66.
Tin, Pei Shi, et al., "Separation of CO2/CH4 through carbon molecular sieve membranes derived from P84 polyimide," Carbon 2004, p. 3123-3131, v. 42, Elsevier.
Hisieh, Tar-Hwa, "Effects of Oxygen on Thermal Dehydrochlorination of Poly(vidylidene chloride)," Polymer Journal, 1999, p. 948-954, v. 31, No. 11-1.
Burnett, G.M., "Dehydrochlorination of polymers-I. Polyvinylidene chloride," European Polymer Journal, 1967, p. 449-457, v. 3, No. 3.
Laredo, Georgina C., et al., "Benzene reduction in gasoline range streams by adsorption processes using a PVDC-PVC carbon molecular sieve," Fule, 2014, p. 459-467, v. 135, Elsevier.
Laredo, Georgina C., et al., "Octane enhancement by the selective separation of branched and linear paraffins in haphthas using a PVDC-PVC carbon molecular sieve," Fuel, 2014, p. 660-666, v. 117, Elsevier.
Laredo, Georgina C., et al., "Dual-site Langmuir modeling of the liquid phase adsorption of linear and branched paraffins onto a PVDC carbon molecular sieve," Fuel, 2012, p. 404-413, v. 102, Elsevier.
Lamond, T.G., "6A Molecular Sieve Properties of Saran-Type Carbons," Carbon, 1965, p. 59-63, v. 3, Great Britain.
Barton, Stuart S., "An Investigation of the Pore Structure and Molecular Sieve Properties of Polyvinylidene Chloride Carbons," Journal of Colloid and Interface Science, 1974, p. 462-468, v. 49, No.
Adams, L.B., et al., "Adsorption of Organic Vapours by Saran-Carbon Fibres and Powders," Carbon 1970, p. 761-772, v. 8, Pergamon Press, Great Britain.
Kitagawa, H., et al., "Adsorptive properties of carbon molecular sieve from Sarran," Carbon, 1981, p. 470-472, v. 19, Pergamon Press, Great Britain.
Quinn, D.F., et. al., "Natural Gas Storage," Carbon 1992, p. 1097-1103, v. 30, No. 7, Pergamon Press, Great Britain.
Kim, Youn Kook, et al., "Preparation and characterization of carbon molecular sieve membranes derived from BTDA-ODA polyimide and their gas separation properties," Journal of Membrane Science, 2005, p. 265-273, v. 255, Elsevier.
Shusen, Wang, et al., "Asymmetric molecular sieve carbon membranes," Journal of Membrane Science, 1996, p. 267-270, v. 109, Elsevier.
Centeno, Teresa A., et. al., "Supported carbon molecular sieve membranes based on a phenolic resin," Journal of Membrane Science, p. 201-211, v. 160, Elseviere.
Wang, Huanting, et al., "Preparation of supported carbon membranes from furfuryl alcohol by vapor deposition polymerization," Journal of Membrane Science, 2000, p. 25-31, v. 177, Elsevier.
Liu, Junqiang, et al., "High throughout development of one carbon molecular sieve for many gas separations," Microporous and Mesoporous Materials, 2015, p. 207-216, v. 206, Elsevier.
Kim, Y.J., et. al., "Correlation between the pore and solvated ion size on capacitance uptake of PVDC-based carbons," Carbon, 2004, p. 1491-1500, v. 42, Elsevier.
Ruthven, Douglas, J., et. al., "Adsorptive separation of light olefins from paraffins," Microporous and Mesoporous Materials, 2007, p. 59-66, v. 104, Elsevier.
Liu, Junqiang, et. al., "A new carbon molecular sieve for propylene/propane separations," Carbon, 2015, p. 201-211, v. 85 Elsevier.
Fernandez-Morales, I., et. al., "Adsorption capacity of saran carbons at high temperatures and under dynamic conditions," Carbon, 1984, p. 301-304, v. 22, No. 3, Pergamon Press, Great Britain.
Franklin, Rosalind E., "Crystallite growth in graphitizing and non-graphitizing carbons," Proceedings of the Royal Society of London Series A: Mathematical and Physical Sciences, 1951, p. 196-218.
Grande, Carlos A., et. al., "Crystal Size Effect in Vacuum Pressure-Swing Adsorption for Propane/Propylene Separation," Ind. Eng. Chem. Res., 2004, p. 7557-7565, v. 43.
Laredo, Georgina C., et al., "Adsorption Equilibrium and Kinetics of Branched Octane Isomers on a Polyvinylidene Chloride-Based Carbon Molecular Sieve," Energy & Fuels, 2008, p. 2641-2648, v. 22.
Kim, Y.J., et. al., "Heat treatment temperature effects on structural and electrochemical properties of PVDC-based disordered carbons," Journal of Materials Science, 2003, p. 2987-2991, v. 38.
Endo, M., et. al., "Heat-treatment retention time dependence of polyvinylidenechloride-based carbons in their application to electric double-layer capacitors," J. Mater. Res., 2003, p. 693-701, v. 18.
Wessling, R.A., "Polyvinylidene Chloride," 1997, Gordon and Breach Science Publishers, Inc., New York.
Endo, M., et al., "High capacities EDLC using a carbon material obtained by carbonization of PVDC—The effect of the crystallite seize of the pristine PDVDC," Electrochem Solid State Lett., 2003, p. A23-A6, v. 6, No. 2.
Shiflett, M.B., et. al., "Ultrasonic deposition of high-selectivity nanoporous carbon membranes," Science, 1999, p. 1902-1905, v. 285.
Communication pursuant to Article 94(3) EPC, dated Aug. 23, 2019, pertaining to European patent application No. 17714088.3.
Notice of Allowance dated Jan. 19, 2021, for U.S. Appl. No. 16/085,038, filed Sep. 14, 2018.
First Office Action dated Dec. 18, 2020, for Chinese Patent Application No. 201780014426.4 filed Mar. 14, 2017.
Office Action dated Feb. 24, 2021 dated Mar. 2, 2021, for Japanese Patent Application No. 2018-545887 filed Mar. 14, 2017.
Office Action dated Mar. 16, 2021 for Korean Patent Application No. 2018-7027434 filed Mar. 14, 2017.
Communication pursuant to Article 94(3) EPC, dated Mar. 3, 2022, pertaining to EP application No. 17714088.6 6 pages.
Canadian Office Action dated, dated Dec. 28, 2022, pertaining to Canadian Patent Application No. 3017949, 4 pages.
Brazil Technical Report dated Oct. 21, 2022, pertaining to BR application No. BR 112018068104-0 3 pages.
Canadian Office Action dated Nov. 22, 2023, pertaining to CA Patent Application No. 3,017,949, 3 pgs.

\* cited by examiner

SEPARATION OF GASES VIA CARBONIZED VINYLIDENE CHLORIDE COPOLYMER GAS SEPARATION MEMBRANES AND PROCESSES THEREFOR

CROSS-REFERENCE TO RELATED APPLICATIONS

This application is a Divisional Application of application Ser. No. 16/085,038, filed Sep. 14, 2018, which is a National Stage Entry of International Patent Application No. PCT/US2017/022275, filed Mar. 14, 2017, which claims priority to U.S. Provisional Application Ser. No. 62/308,899, filed Mar. 16, 2021, the entire contents of which are hereby incorporated by reference.

The present invention relates to the field of gas separation using a carbon membrane. More particularly, it relates to the separation of gases and in particular hydrogen from a gas mixture by passing the gas mixture through a carbonized vinylidene chloride copolymer membrane (film or hollow fiber wall).

Carbon molecular sieves (CMS) and CMS membranes have been used to separate gases. CMSs may be prepared from a variety of resins that are pyrolyzed at various temperatures and/or under various conditions. The pyrolysis reduces the resins to carbon, but maintains at least some porosity, in the form of micropores, in the pyrolyzed product. The CMSs thus formed may then be employed in conventional gas separations equipment employing adsorption of particular gases, such as packed beds, columns, and the like, where the micropore size determines which gas in a gas mixture is adsorbed and which is not. Adsorption and desorption techniques may be alternated to carry out the separation, according to, for example, conventional pressure swing or temperature swing adsorption methods. CMS membranes have also been used to separate gases by flowing gas mixtures through the CMS membranes.

However, there is a particular challenge in the art to prepare CMSs having micropores of the correct size(s) for certain particular separations. Since the use of CMSs to accomplish separations assumes that the micropores are at least as large as, or larger than, the specified molecule that will enter the micropores, it is necessary to know the "size" of the molecule. Different ways to determine that molecular size have been developed. One commonly employed approach has been to determine a given molecule's "kinetic diameter." A reference listing a variety of these kinetic diameters, based upon their use in zeolite applications, is D. W. Breck, *Zeolite Molecular Sieves: Structure, Chemistry and Use*, John Wiley & Sons, Inc. (New York, NY 1974), 636, and these determinations are frequently used even with respect to non-zeolite, carbon molecular sieves that are known to have slit-shaped pores. In view of the above and for purposes hereof, then, the following kinetic diameters, taken from the Breck reference cited supra, are used herein as the representative molecular diameters for the following molecules: He (2.6 Angstroms, Å), $H_2$ (2.89 Å), $N_2$ (3.64 Å), $CO_2$ (3.3 Å), $CH_4$ (3.8 Å), $C_2H_4$ (3.9 Å), $C_3H_8$ (4.3 Å), i-$C_4H_{10}$ (5.0 Å), $SF_6$ (sulfur hexafluoride) (5.5 Å), and i-$C_8H_{18}$ (iso-octane) (6.2 Å). However, because that reference table lacks a kinetic diameter for ethane, and the kinetic diameter given therein for propylene is believed by at least some researchers to be inaccurate for CMS materials per se, the Lennard-Jones collision diameters are used herein, instead of the Breck kinetic diameters, for those two materials. These Lennard-Jones collision diameters are, respectively, $C_2H_6$ (4.1 Å), and $C_3H_6$ (4.0 Å). See, for example, Staudt-Bickel C., Koros W. J., "Olefin/paraffin gas separations with 6FDA-based polyimide membranes," *J. Membr. Sci.* (2000) 170 (2), 205-214 for further discussion. The kinetic diameters and Lennard-Jones collision diameters are referred to together as "representative molecular diameters."

Polyvinylidine chloride (PVDC) copolymers have been pyrolyzed to form carbon molecular sieves, but they have tended to form larger pores. Lamond T. G., et al., "6 Å molecular sieve properties of SARAN-type carbons," Carbon (1965) 3, 59-63. This article describes preparation of a CMS, from a polyvinylidene chloride (PVDC) copolymer, that rejects neopentane (6.0 Å) molecules, but adsorbs smaller molecules, such as, in non-limiting example, $CO_2$, butane, and iso-butane, non-selectively. In view of this the authors of that article concluded that their CMS had 6 Å micropores.

Another example is disclosed in T. A. Centeno, et al., "Molecular sieve gas separation membranes based on poly (vinylidene chloride-co-vinyl chloride)," Carbon (2000) 38, 1067-1073. This article describes preparation of a composite carbon membrane using the aforesaid material. The membrane is formed with a thin microporous carbon layer (thickness of 0.8 micrometers, μm) obtained by pyrolysis of the polymeric film, supported over a macroporous carbon substrate (pore size 1 μm; macroporosity 30 percent, %). Single gas permeation experiments include helium (He), $CO_2$, oxygen ($O_2$), nitrogen ($N_2$) and methane ($CH_4$). Selectivities are described as particularly high for $O_2/N_2$ systems, i.e., a selectivity of about 14 at 25 degrees Celsius (° C.). From this information it can be inferred that the micropore size falls somewhere in a range from the representative molecular diameter of $O_2$ (3.46 Å) to that of $N_2$ (3.64 Å). This CMS membrane is prepared by pre-treating the supported film at 200° C., a temperature at which the PVDC copolymer precursor is melted before carbonization. The fact that melting is required means that the disclosed CMS structures cannot be prepared in unsupported forms.

In other research, including for example, Laredo G. C., Meneses E., Castillo J., Marroquin J. O., Jimeenez-Cruz F., "Adsorption equilibrium and kinetics of branched octane isomers on a polyvinylidene chloride-based carbon molecular sieve," Energy Fuels (2008) 22 (4) 2641-2648, polyvinylidene chloride copolymer-based CMSs have been prepared that exhibit relatively large micropore sizes and pore volumes that are suitable for separation of correspondingly large molecules, i.e., those having a representative molecular diameter greater than 5.0 Å.

More recently, WO/2016/003680 described forming a CMS from PVDC copolymers using a two-step pyrolysis at high temperatures from 800° C. to 1700° C. The CMS formed had an average pore size in the range of 3 Å to 5 Å. These CMS were described as being useful for separating Propylene ($C_3H_6$) and propane ($C_3H_8$); carbon dioxide ($CO_2$) and nitrogen ($N_2$); $N_2$ and methane ($CH_4$); ethylene ($C_2H_4$) and ethane ($C_2H_6$); and n-butane ($C_4H_{10}$) and i-butane ($C_4H_{10}$).

CMS membranes formed from PVDC copolymers have also been made, but they have suffered from low or reverse (rejection of hydrogen with presence of hydrocarbons) hydrogen selectivity as described by M. B. Rao and S. Sircar in *J. Membrane Science*, 85 (1993) 253-264; T. A. Centeno and A. B Fuertes in *Carbon*, 38 (2000) 1067-1073 and K. Zhang and J. D. Way in *J. Membrane Science* 369(2011) 243-249.

The gas permeation properties of a membrane can be determined by gas permeation experiments. Two intrinsic properties have utility in evaluating separation performance of a membrane material: its "permeability," a measure of the membrane's intrinsic productivity; and its "selectivity," a measure of the membrane's separation efficiency. One typically determines "permeability" in Barrer (1 Barrer=$10^{-10}$ [cm$^3$ (STP) cm]/[cm$^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i l}{\Delta p_i}$$

Another term, "permeance," is defined herein as productivity of the membrane or hollow fiber membranes and is typically measured in Gas Permeation Units (GPU) (1 GPU=$10^{-6}$ [cm$^3$ (STP)]/[cm$^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ratio of one gas's permeability through the membrane or permeance relative to the same property of another gas. It is measured as a unitless ratio.

$$\alpha_{i/j} = \frac{P_i}{P_j} = \frac{(P_i/l)}{(P_j/l)}$$

Thus, it would be desirable to realize a CMS membrane and process to make the CMS membrane from PVDC that would be useful in separating hydrogen from gas mixtures such as those encountered in syngas, gases generated in oil refineries, natural gas and olefin cracker gas streams. It would be particularly desirable to provide a PVDC CMS that is in the form of an un-supported membrane or hollow fiber.

One aspect of the invention is a process for separating hydrogen from a gas mixture having hydrogen and a larger gas molecule, the method comprising
(i) providing a carbonized polyvinylidene chloride copolymer membrane having a hydrogen permeance in combination with a hydrogen/methane selectivity, wherein the combination of hydrogen permeance and hydrogen/methane selectivity is (i) at least 30 GPU hydrogen permeance and at least 200 hydrogen/methane selectivity or (ii) at least 10 GPU hydrogen permeance and at least 700 hydrogen/methane selectivity; and
(ii) flowing the gas mixture through said carbonized polyvinylidene chloride copolymer membrane to produce a first permeate stream having an increased concentration of the hydrogen and a second retenate stream having an increased concentration of the larger gas molecule.

A second aspect of the invention is a method of making a carbonized polyvinylidene chloride copolymer comprising,
(a) providing a polyvinylidene chloride copolymer film or hollow fiber having a thickness of 1 micrometer to 250 micrometers,
(b) heating and restraining the polyvinylidene chloride copolymer film to a pretreatment temperature of 100° C. to 180° C. to form a pretreated polyvinylidene chloride copolymer film,
(c) heating and restraining the pretreated polyvinylidene chloride copolymer film to a maximum pyrolysis temperature from 350° C. to 750° C. Applicants have surprisingly discovered a PVDC CMS membrane that even though it has an average or representative pore size significantly larger than hydrogen and even larger than the gas molecule to be separated (e.g., methane) as determined by adsorption of gas molecules the PVDC CMS membrane has a high hydrogen permeance yet a high selectivity in separating the hydrogen from gas molecules such as methane (e.g., $H_2$/$CH_4$ selectivity). It is unknown why, but without being limiting in any way, it is believed that the particular process may realize an asymmetric microstructure across the film thickness where there may be large pores at the surface of the film and a narrow band within the film that has a smaller pore size. The asymmetry may be a result of varying localized atmospheres during the pre-treatment and pyrolysis (e.g., partial pressure of HCl), which may be due to the thickness of the films, restraining of the films or combinations thereof.

The PVDC CMSs of the invention may be prepared from a vinylidene chloride copolymer, comprising a vinylidene chloride monomer and at least one additional comonomer. The comonomer may be selected from a variety of materials, including in particular embodiments a vinyl monomer, vinyl chloride monomer, an acrylate monomer, a methacrylate monomer, a styrenic monomer, acrylonitrile, methacrylonitrile, itaconic acid, chlorotrifluoroethylene, and combinations thereof. In more particular embodiments examples of the vinyl monomers include vinyl chloride, vinyl acetate, acrylonitrile, and combinations thereof. More particular examples of the acrylate monomers include methyl acrylate, ethyl acrylate, butyl acrylate, and combinations thereof. More particular examples of methacrylate monomers include methyl methacrylate, butyl methacrylate, and combinations thereof. A more particular example of styrenic monomers is styrene itself.

In proportion it is preferred that the vinylidene chloride based copolymer, which is herein termed a polyvinylidene copolymer (PVDC), includes at least 60 wt % of vinylidene chloride, based on total weight of the copolymer, and in more preferred embodiments at least 70 wt %. However, it is further desired that the PVDC contains a maximum of 97 wt % vinylidene chloride, and thus preferably contains a minimum of at least 3 wt % of the comonomer or comonomer combination; more preferably from 3 wt % to 40 wt %; still more preferably from 3 wt % to 30 wt %; and most preferably from 3 wt % to 20 wt %.

Particular embodiments of PVDCs that are suitable for use in the invention are those including as a comonomer an acrylate, such as methyl acrylate, ethyl acrylate, butyl acrylate, or a combination thereof, in an amount from 3 wt % to 20 wt %, based on the weight of the PVDC as a whole; more preferably from 3.5 wt % to 15 wt %; and most preferably from 4 wt % to 12 wt %. Another particular embodiment is a PVDC including vinyl chloride in an amount from 3 wt % to 30 wt %; more preferably from 7 wt % to 28 wt %; and most preferably from 9 wt % to 25 wt %.

It is also preferred that the overall weight average molecular weight (Mw) of the PVDC copolymer ranges from 10,000 to 250,000; more preferably from 50,000 to 200,000; and most preferably from 60,000 to 150,000.

Use of additives in the PVDC is also contemplated as being within the scope of the invention. Common additives may include, but are not necessarily limited to, epoxidized oil stabilizers such as expoxidized soybean oil, expodized linseed oil, and the diglycidyl ether of bisphenol A. Also frequently employed are liquid plasticizers such as aliphatic and aromatic esters, including for example dibutyl sebacate, acetyl tributyl citrate, dioctyl phthalate, and the like, and combinations thereof. Other common additives may include lubricants, such as polyethylene wax, paraffin wax, oxidized polyethylene wax, and combinations thereof. Lubricants may optionally be included, and may comprise, for example, high density polyethylene, acrylate copolymers and silicone polymers, and combinations thereof. Another group of additives that may be included are acid scavengers such as epoxy compounds, magnesium hydroxide, magnesium oxide, tetrasodium pyrophosphate, calcium phosphate, magnesium phosphate, DHT 4A (a synthetic hydrotalcite-like halogen scavenger available from Kyowa Chemical Industry), calcium oxide, calcium carbonate, and combinations thereof. Antioxidants such as phenolics may also be incorporated. Combinations of any or all of these types of additives may be included in the PVDC.

In proportion, it is preferred that the total amount of all additives combined be no more than 15 wt %, and more preferably no more than 8 wt % or 3 wt %. In many applications, however, an amount of all additives combined of at least 2 wt % may be typical, with use thereof therefore ranging preferably from 2 wt % to 8 wt %, and more preferably from 2 wt % to 3 wt %. Those skilled in the art will be aware of the use of such additives and their indications and contraindications without further direction herein.

Those skilled in the art will also be aware of a variety of means and methods for preparing copolymers. However, in general any of the typical or conventional methods of polymerization, including but not limited to mass polymerization, suspension polymerization, and emulsion polymerization, and preferably suspension polymerization or emulsion polymerization, may be employed. It is generally preferred that polymerization is carried out at a temperature that ensures avoidance of degradation of all of the PVDC components, e.g., preferably from 10° C. to 120° C.; more preferably from 20° C. to 100° C.; and most preferably from 30° C. to 90° C.

Following completion of the copolymerization, the PVDC may be formed into a film or hollow fiber by any suitable method such as those known in the art. For example the PVDC may be melt-extruded, solution or latex cast in order to form the PVDC into a thin film or hollow fiber. Where films are desired, a conventionally known preparation process such as a blown film process, for example, a double bubble process or a cast film tentering process, may be especially useful to produce a biaxially oriented film. It is more preferred that a double bubble process be employed in order to concurrently extrude, biaxially orient, and anneal the PVDC film. Fibers may be produced by uniaxial stretching using known fiber processes for PVDC copolymers, and may be round or shaped hollow fibers, or of any other desired hollow fiber morphology. It is also contemplated that precursor films and/or fibers may be coextruded with multiple PVDC copolymers and/or with other polymers.

It is noted that either the film or fiber preparation process may optionally include stretching, such as stretching of the resin to form a melt-extruded film or fiber. This stretching may, in particular embodiments, be particularly effective in inducing more rapid crystallization and in increasing, and therefore improving, alignment of the PVDC crystallites. Desirably the stretch ratio ranges from 1 to 8, more desirably from 1 to 6, still more desirably from 1 to 4, and most desirably from 2 to 4.

Generally it is useful for the PVDC to have some amount of crystallinity. In the present invention this crystallinity typically ranges from 25% to 75% of the resin or formed film, as measured by differential scanning calorimetry (DSC) according to ASTM D3418. It is more preferred that this level ranges from 30% to 55%, and most preferred that this level ranges from 35% to 50%. Thus, inclusion of a comonomer generally helps to reduce precursor crystallinity to ensure the desired range, and also to reduce the melt temperature and thereby improve processability of the resulting copolymer. In general, inclusion of bulkier monomers may tend to reduce overall copolymer crystallinity by a greater amount than inclusion of less bulky monomers. Thus, for example, butyl acrylate will tend to reduce crystallinity more than, for example, methyl acrylate or ethyl acrylate, assuming such is/are used in the same mole percent (mol %) based on final copolymer composition.

To form the PVDC CMS films or hollow fibers of the present invention a pre-treatment prior to pyrolysis is employed. Generally the pre-treatment is used to stabilize, or "lock," the copolymer structure prior to carbonization thereof. In this step the PVDC film or fiber are heated, below the melting temperature thereof (typically less than about 180° C., depending upon the exact composition of the precursor), in order to dehydrochlorinate the film to the extent of at least 10%. As used herein, the term "at least 10% dehydrochlorinated" means that the film or fiber has been pre-treated, by removing hydrogen chloride, to a point at which the PVDC copolymer film or fiber no longer melts and, in fact, begins to become infusible. It is well-accepted in the art that such a change in molecular kinetics begins to occur at a point of approximately 10% dehydrochlorination and is completed or maintained as the level of dehydrochlorination increases above that point. This step is termed a "pre-treatment" because it occurs prior to a pyrolysis step, which is the treatment step wherein carbonization is accomplished.

During the pre-treatment the copolymer structure's temperature is preferably maintained in a range of from 100° C. to 180° C., more preferably from 120° C. to 160° C., and most preferably from 130° C. to 150° C. This is preferably done in air for convenience, but other atmospheres, such as $N_2$ and other inert gases or oxidizing gases such as $CO_2$, or combinations thereof, may also or alternatively be used, since generally only minor levels of oxidation of the copolymer are anticipated within the overall given temperature range. Achievement of the desired dehydrochlorination, that is responsible for the formation of the locked structure, may be accomplished by exposure to a source of high energy irradiation, such as gamma rays, an electron beam, ultraviolet light, or a combination thereof. The time may vary from 1 hour (hr) to 48 hr, preferably from 1 hr to 24 hr, and most preferably from 1 hr to 12 hr, as needed to reach the at least 10% dehydrochlorination point, at which the copolymer begins to become infusible, i.e., no longer able to be melted. The dehydrochlorination degree can vary from 5% to 100%, depending upon pretreatment temperature and time. Where more than visual confirmation of the beginning of infusibility is desired, additional confirmation of the percentage of dehydrochlorination may be obtained by means of, for example, Thermo Gravimetric Analysis (TGA), using standard and well-known methods and equipment.

During the pre-treatment the fiber or film is restrained to maintain its shape. The particular restraining method may be any known in the art and may be held in tension or compression. In a particular embodiment, particularly for films, they are restrained by applying a compressive force. In particular the film is placed between two flat substrates that may be impervious to gases including the HCl being removed. Illustratively, the film may be constrained between two low surface energy plates (e.g., TEFLON plates or sheets), which are further interposed between two metal, ceramic or graphite plates. Alternatively, the plates may be pervious to gases such as the HCl being removed such as honeycomb structures. The amount of tension or compression may be any useful amount, but typically may range from 0.01 MPa to 10 MPa, from 0.1 to 1 MPa, or from 0.1 to 0.5 MPa. In the same manner, the restraining during pyrolysis may be performed in the same fashion with similar substrates, which can withstand the maximum pyrolysis temperatures used.

Following the dehydrochlorination pre-treatment, the pre-treated film or pre-treated fiber, or alternatively pre-treated CMS material, is pyrolyzed. Preferably such pyrolysis results in at least 90 wt % of the copolymer becoming carbonized, more preferably at least 95 wt %, and most preferably at least 99 wt %. As already pointed out hereinabove, this pyrolysis is also termed "carbonization," because the result thereof is that the copolymer is converted to the carbon-only, or near carbon-only, skeleton of its copolymer structure, i.e., all or virtually all atoms other than carbon have been removed, but the carbon-carbon bonds remain substantially intact, and the CMS may now be termed to be "carbonaceous." The pyrolysis may be carried out using any means generally known to those skilled in the art, but may be carried out at an attained maximum temperature within the range of from 350° C. to 750° C. Desirably, the temperature is at least 400° C., 450° C. to at most 700° C., 650° C., 600° C. or 550° C.

The method may form a PVDC CMS membrane that has a combination of hydrogen permeance and hydrogen/methane selectivity highly useful for separating hydrogen from gases containing methane. Such combinations generally require reasonably high hydrogen permeance with reasonably high selectivity or lower hydrogen permeance with much higher selectivity. Generally, if the hydrogen permeance is less than 30 GPU, it is desirable for the hydrogen/methane selectivity to be at least 700. If the hydrogen permeance is greater than 30 GPU, the hydrogen/methane selectivity may be about 200 or greater. Regardless, it is desirable for the hydrogen permeance to be at least 40, 50, 60, 80 or even 100 to several hundreds. Desirably, the hydrogen/methane selectivity is at least 100, 150, 200, 250, 400 or even 500 to any practical amount (e.g., several thousand) when the hydrogen permeance is greater than about 30. Desirably, the hydrogen/methane selectivity is at least 750, 800, 900, or even 1000 to any practical amount (e.g., several thousand) when the hydrogen permeance is less than 30 (i.e., about 10 to 30).

Surprisingly, the PVDC membranes may have an average pore size that is larger than hydrogen and a larger gas molecule than hydrogen in a gas mixture. The larger gas molecule may be comprised of olefins or paraffins. Examples of the larger gas molecule include carbon dioxide, nitrogen, carbon monoxide, methane, ethane, propane, ethylene, propylene, butane, or butylene. It is surprising, since the selectivity of hydrogen/methane as well as for other hydrogen/larger gas molecule selectivities, even though the average pore size of the membrane is larger than the larger gas molecule diameter, which would indicate that such larger gas molecule would not be preferentially rejected when flowing through the membrane (i.e., fits into the pores and would be expected to flow through the membrane). Thus, this gives rise to the belief an asymmetric structure is formed in the film as described above. In general, the average pore size of the PVDC CMS membrane at least 3 Å, 4 Å or even 5 Å to at most about 15 Å. The average pore size of the membrane may be determined by adsorption as described below in the Examples.

In addition to average micropore size, it is also often desirable in the art to optimize total micropore volume, which may be measured via the Brunauer-Emmett-Teller (BET) method at liquid $N_2$ temperature. Such may be further confirmed via helium (He) pycnometry and mercury (Hg) intrusion. For most separations applications, a total micropore volume of at least 0.10 mL/g, preferably at least 0.15 mL/g, more preferably at least 0.20 mL/g, according to the BET method at liquid $N_2$ temperature, is needed to ensure commercially efficient desirable gas adsorption.

The average micropore size and/or average micropore volume seem to suffer little, if any, alteration when additional factors, including but not limited to ramp rate to reach the attained maximum pyrolysis temperature, and/or hold time at the attained maximum pyrolysis temperature, are introduced and/or considered. For example, for industrial purposes, ramp rates ranging from 0.1° C./min to 10° C./min are typical, and hold times may range from 0 minutes (min) (i.e., ramping to the attained maximum temperature followed by immediate active or passive temperature reduction) up to 60 min (i.e., holding at the attained maximum pyrolysis temperature for up to 60 min prior to active or passive temperature reduction) are typical. The atmosphere may be any that realizes the PVDC CMS membrane. That is the atmosphere that does not substantially oxidize the PVDC and may include inert, or reducing atmospheres such as static or flowing nitrogen, inert gas (e.g., argon), carbon monoxide, hydrogen or any combination thereof.

The CMS membranes are particularly suitable for separating hydrogen from other gases in a gas feed containing hydrogen and another larger gas molecule. In performing the process, the gas feed is flowed (over and through the membrane) such that a first stream (permeate) having an increased concentration of the desired hydrogen and second stream (retentate) having an increased concentration of the other gas molecule(s) results. When practicing the process, the CMS membrane is generally fabricated into a module comprising a sealable enclosure comprised of one or more of the carbon molecular sieve membranes described herein contained within the sealable enclosure. The sealable enclosure has an inlet for introducing a gas feed comprised of hydrogen and at least one other larger gas molecule; a first outlet for permitting egress of a permeate gas stream (i.e., hydrogen); and a second outlet for egress of a retentate gas stream (i.e., the other larger gas molecule(s)).

EXAMPLES

PVDC Copolymer Film Preparation:
Melt Extruded Films of MA 4.8 wt % Copolymer

Base resin XUS32904.01 available from The Dow Chemical Company, Midland, MI (PVDC copolymer with 4.8 wt % methyl acrylate (MA) comonomer, Mw=96,000) was blended with 2 wt % epoxidized soybean oil (based on total amount of blend), 4 wt % dibutyl sebacate, and 2 wt % PLASTISTRENGTH L-1000 an acrylic lubricant available from Arkema PLC, France. The blend was extruded through a 1.75 inch width film die (controlled at 174° C.) followed by water quench and stretch winding. The wind rate was controlled to obtain films of different thicknesses: 2, 4, 8, and 12 mil (1 mil=25.4 micrometer). The films after winding were cut into approximately 12 inch wide and 2 feet length pieces and laid on flat desktop for about one week. Coupons of ⅞ inch diameter were cut for carbonization as described below.

Melt Extruded Films of MA 8.5 wt % Copolymer

Base resin SARAN 806 available from The Dow Chemical Company (PVDC copolymer with 8.5 wt % methyl acrylate comonomer, Mw=85,000) was blended with 2 wt % epoxidized soybean oil and 2 wt % PLASTISTRENGTH L-1000. The blend was extruded in the same manner as above. The wind rate was controlled to obtain films of different thicknesses: 2, 4, 8, and 12 mil. The films after winding were cut into approximately 12 inch wide and 2 feet length pieces and laid on flat desktop for about one week.

Solution Cast Films of MA 4.8% Resin

Base resin XUS 32904.01 was dissolved in tetrahydrofuran (THF) to realize a 15 wt % polymer solution. The solution was poured onto a flat glass plate and cast using a knife having a 28 mil clearance. Approximately 2 mil films were obtained after the THF evaporated in air.

Solution Cast Films of VC 17.6% Resin

Base resin XUS 32061.01 was dissolved in tetrahydrofuran to make a 15 wt % polymer solution. The solution is poured onto a flat glass plate and cast using a 28 mil clearance knife. Approximately 2 mil film was obtained after solvent evaporation.

Latex Cast Films of DARAN SL158

Latex dispersion of DARAN SL158 (Owensboro Specialty Polymers, Inc.) was poured onto glass plate and cast using a knife having a 4 mil clearance. The cast films were dried at 75° C. in an air purged oven for about 2 hours. Approximately 1.5 mil films were obtained. Table 1 shows a summary of information on all eleven precursor films.

TABLE 1

Precursor Films

| Precursor Film # | Preparation method | Base resin | Film thickness [mil] |
|---|---|---|---|
| 1 | Melt extrusion | XUS32904.01 | 2 |
| 2 | Melt extrusion | XUS32904.01 | 4 |
| 3 | Melt extrusion | XUS32904.01 | 8 |
| 4 | Melt extrusion | XUS32904.01 | 12 |
| 5 | Melt extrusion | SARAN 806 | 2 |
| 6 | Melt extrusion | SARAN 806 | 4 |
| 7 | Melt extrusion | SARAN 806 | 8 |
| 8 | Melt extrusion | SARAN 806 | 12 |
| 9 | Solution casting | XUS 32904.01 | 2 |
| 10 | Solution casting | XUS 32061.01 | 2 |
| 11 | Latex casting | DARAN SL158 | 1.5 |

Carbon Membrane Formation

A two-step pyrolysis approach was used. The precursor films were heated to a first temperature of 130-150° C. for 24 hours in a low temperature oven purged by 2 L/min of air (pretreated films), which was followed by further heating to pyrolyze the pretreated films to temperatures in the range of 350-950° C. in a 6" ID quartz tube furnace purged by 5 L/min of nitrogen.

For the initial low temperature pretreatment, 12 disks (⅞ inch diameter) sandwiched between graphite plates, with two pieces of 10 mil TEFLON sheets being used to separate the two sides of the membrane from the graphite plates. The weight of graphite plates are about 0.2-0.8 kg. Alternatively, the graphite plates and TEFLON sheets were replaced with porous ceramic honeycomb plates, through which HCl generated should be transported out swiftly. A scrubber connected to this oven contained a 10 wt % sodium hydroxide aqueous solution. A loaded oven was heated at 1° C./min to 130, 140, or 150° C. and held for 24 hour under 2 L/min of air purge.

For the second heating step, the 12 pretreated disks were sandwiched between the graphite plates without the Teflon sheets or honeycomb plates were loaded into a 6" ID quartz tube furnace. A scrubber connected to this furnace contained a 10 wt % sodium hydroxide aqueous solution. The furnace was raised to different final temperatures ranging from 350-950° C. at various ramp rates (1, 3, 5° C./min), and held for 30 minutes at the final temperature and then cooled down to room temperature (~25° C.). After cooling down, the carbon membranes were put into a storage box continuously purged with dry nitrogen at a flow rate of 5 Liter/min.

Carbon Membrane Permeation Test Protocol

The carbon membranes were masked onto a standard 25 mm filter holder (Millipore #4502500, EMD Millipore Corp., Germany) using an impermeable aluminum tape, leaving an open defined permeation area. A two-part epoxy (J-B Weld twin tube) was then applied along the interface of the tape and the carbon membranes. Single gas permeation tests of several gas species were conducted at 20° C. with a continuous upstream feed (25 sccm, 1 atm) and downstream He purge (2.0 sccm, 1 atm). The permeate carried by the He purge gas was analyzed by a GC (gas chromatograph) with a TCD (thermal conductivity detector for $H_2$ and $CO_2$) and FID (flame ionization detector for $CH_4$). The concentrations in all gases were lower than 5%, so the gas flow rate in downstream was considered the same as the He flow rate. The membrane permeate rate was calculated using the He purge flow rate times the permeate concentrations measured by GC. The single gas permeation tests were conducted in the following order—$H_2$, $CO_2$, and $CH_4$. The tests were run for several hours to days until the permeate concentrations were steady. The parameters to make the carbon membranes and the resulting permeation results are shown in Table 2.

TABLE 2

| CMS film Example | Pre-treatment Temp. [° C.] | Final Pyrolysis Temp. [° C.]* | Ramp rate [° C./-min] | Precursor film # | Sandwich Plates | Hydrogen Permeance (GPU) | Methane Permeance (GPU) | $H_2/CH_4$ Selectivity |
|---|---|---|---|---|---|---|---|---|
| Comp Ex 1 | 140 | 350 | 1 | 3 | Graphite | 0.7 | 0.026 | 28 |
| Ex 1 | 130 | 950 | 1 | 4 | Graphite | 11.1 | 0.003* | 4269* |
| Ex 2 | 130 | 650 | 1 | 1 | Graphite | 53.0 | 0.058 | 914 |
| Ex 3 | 140 | 950 | 3 | 2 | Graphite | 10.7 | 0.008* | 1390* |
| Comp Ex 2 | 150 | 350 | 3 | 1 | Graphite | 3.7 | 0.083 | 45 |
| Ex 4 | 150 | 800 | 1 | 2 | Graphite | 17.5 | 0.017 | 1007 |
| Ex 5 | 150 | 650 | 3 | 2 | Graphite | 49.5 | 0.064 | 773 |
| Ex 6 | 130 | 800 | 3 | 4 | Graphite | 17.3 | 0.018 | 979 |

TABLE 2-continued

| CMS film Example | Pre-treatment Temp. [° C.] | Final Pyrolysis Temp. [° C.]* | Ramp rate [° C./-min] | Precursor film # | Sandwich Plates | Hydrogen Permeance (GPU) | Methane Permeance (GPU) | $H_2/CH_4$ Selectivity |
|---|---|---|---|---|---|---|---|---|
| Ex 7 | 130 | 500 | 3 | 3 | Graphite | 65.4 | 0.274 | 239 |
| Ex 8 | 140 | 650 | 5 | 4 | Graphite | 37.6 | 0.044 | 863 |
| Comp Ex 3 | 150 | 500 | 1 | 4 | Graphite | 37.4 | 0.105 | 356 |
| Comp Ex 4 | 130 | 350 | 5 | 2 | Graphite | 1.3 | 0.049 | 27 |
| Ex 9 | 140 | 500 | 5 | 1 | Graphite | 35.0 | 0.017 | 2120 |
| Ex 10 | 150 | 950 | 5 | 3 | Graphite | 19.8 | 0.011 | 1850 |
| Ex 11 | 130 | 500 | 3 | 1 | Honeycomb | 169.0 | 0.487 | 350 |
| Ex 12 | 130 | 500 | 3 | 2 | Honeycomb | 96.9 | 0.479 | 246 |
| Ex 13 | 130 | 500 | 3 | 3 | Honeycomb | 66.4 | 0.483 | 149 |
| Ex 14 | 130 | 500 | 3 | 4 | Honeycomb | 46.2 | 0.257 | 204 |
| Ex 15 | 130 | 500 | 3 | 5 | Honeycomb | 151.8 | 1.598 | 95 |
| Ex 16 | 130 | 500 | 3 | 6 | Honeycomb | 92.3 | 0.322 | 286 |
| Ex 17 | 130 | 500 | 3 | 7 | Honeycomb | 65.7 | 0.614 | 107 |
| Ex 18 | 130 | 500 | 3 | 8 | Honeycomb | 47.7 | 0.171 | 279 |
| Ex 19 | 130 | 500 | 3 | 9 | Honeycomb | 90.5 | 0.135 | 670 |
| Ex 20 | 130 | 500 | 3 | 10 | Honeycomb | 125.5 | 0.756 | 166 |
| Ex 21 | 130 | 500 | 3 | 11 | Honeycomb | 98.6 | 0.206 | 478 |
| Ex 22** | 150 | 700 | 1 | 2 | Honeycomb | 78.0 | 0.26 | 385 |

*Very close to detection limit
**Pretreatment for 150° C. for 60 hours, then pyrolysis with 1° C./min to 700° C., hold 0 minute From the results shown in Table 2, the final pyrolysis temperature has the most effect on the $H_2$ permeance and $H_2/CH_4$ selectivity. The membranes with final temperature around 500-650° C. showed the best combination of $H_2$ permeance and $H_2/CH_4$ selectivities. In Examples 11-14, which were made of different thicknesses of melt extruded PVDC-MA 4.8% resin, both $H_2$ permeance and $H_2/CH_4$ selectivity increase as the precursor film thickness decreases from 12 mil to 2 mil. Examples 15-18, which were made of different thicknesses of melt extruded PVDC-MA 8.5% resin, the $H_2$ permeance increases continuously as the precursor film thickness decreases from 12 mil to 2 mil, while the $H_2/CH_4$ selectivity peaks at 4 mil. Therefore, the optimum thickness of precursor film for the combination of $H_2$ permeance and $H_2/CH_4$ selectivity is somewhat dependent on the copolymer composition.

Examples 19 and 20 (solution cast precursor films) as well as Example 21 (latex precursor film) show similar high $H_2$ permeance and $H_2/CH_4$ selectivities as those made of melt extruded films.

Carbon Membrane Adsorption

Gas adsorption was used to measure the average pore size of Example 13. The adsorption was performed using a Micromeritics ASAP 2020 instrument at 20° C. Carbon membranes were broken into pieces (~2-5 mm) and loaded into a quartz sample holder. Each sample was degassed at 100° C. for 12 hours before each gas adsorption was performed in the sequence of $CH_4$, $CO_2$, $C_2H_4$, $C_3H_6$, and $iC_4H_{10}$.

All the gases, except $iC_4H_{10}$, adsorb in large amounts (greater than about 10 cc (STD)/g) at ~600 mmHg: $C_3H_6$ (83.3 cc(STD)/g) and $iC_4H_{10}$ (4.1 cc(STD)/g). From these results, the average micropore size was considered to be between the molecular size of $C_3H_6$ and $iC_4H_{10}$, 4.0-5.0 Å. Therefore, it is expected that the Example 13 carbon membrane would permeate $CH_4$ (3.8 Å molecular size) at a high rate. However, surprisingly, it was found that $CH_4$ gas essentially does not permeate through the Example 13 carbon membrane.

The invention claimed is:

1. A method of making a carbonized polyvinylidene chloride copolymer film or a carbonized hollow fiber, the method comprising, (a) providing a polyvinylidene chloride copolymer film having a thickness of 1 micrometer to 250 micrometers or a hollow fiber having a diameter of 1 micrometer to 250 micrometers, (b) heating the polyvinylidene chloride copolymer film or the hollow fiber to a pretreatment temperature of 100° C. to 180° C. to form a pretreated polyvinylidene chloride copolymer film or a pretreated hollow fiber while restraining the polyvinylidene chloride copolymer film or the hollow fiber, and (c) heating the pretreated polyvinylidene chloride copolymer film or the pretreated hollow fiber to a maximum pyrolysis temperature from 350° C. to 750° C. to produce the carbonized polyvinylidene chloride copolymer or the carbonized hollow fiber while restraining the pretreated polyvinylidene chloride copolymer film or the pretreated hollow fiber, wherein the restraining of steps (b) and (c) is conducted by applying a compressive force, wherein the carbonized polyvinylidene chloride copolymer film or the carbonized hollow fiber has an average pore size greater than a diameter of a large gas molecule larger than hydrogen gas determined by gas adsorption employing gas probe molecules of differing sizes, and wherein the carbonized polyvinylidene chloride copolymer film or the carbonized hollow fiber has a hydrogen permeance in combination with a hydrogen/methane selectivity, wherein the combination of hydrogen permeance and hydrogen/methane selectivity is (i) at least 30 Gas Permeation Unit (GPU) hydrogen permeance and at least 200 hydrogen/methane selectivity or (ii) at least 10 GPU hydrogen permeance and at least 700 hydrogen/methane selectivity.

2. The method of claim 1, wherein the maximum pyrolysis temperature is at most 650° C.

3. The method of claim 1, wherein the polyvinylidene chloride copolymer film is a polyvinylidene chloride copolymer comprised of vinylidene chloride and at least one of the following: a vinyl monomer, a vinyl chloride monomer, an acrylate monomer, a methacrylate monomer, a styrenic monomer, acrylonitrile, methacrylonitrile, itaconic acid, and chlorotrifluoroethylene.

4. The method of claim 1, wherein the polyvinylidene chloride copolymer film has a crystallinity percentage of 25% to 75% determined by differential scanning calorimetry.

5. The method of claim 1, wherein the polyvinylidene chloride copolymer film during step (b) is dehydrochlorinated by at least 10%, but not fully dehydrochlorinated.

6. The method of claim 1, wherein the thickness is from 10 micrometers to 150 micrometers.

7. The method of claim 1, wherein the polyvinylidene chloride copolymer film is formed by melt-extrusion at a stretch ratio from 1 to 8.

8. The method of claim 1, wherein the large gas molecule comprises olefin, paraffin, or both.

* * * * *